US006805545B2

(12) United States Patent
Slaboden

(10) Patent No.: US 6,805,545 B2
(45) Date of Patent: Oct. 19, 2004

(54) MOLDING AND PACKAGING APPARATUS

(76) Inventor: Jeffrey K. Slaboden, 639 Townsend Dr., Aptos, CA (US) 95003

(*) Notice: Subject to any disclaimer, the term of this patent is extended or adjusted under 35 U.S.C. 154(b) by 0 days.

(21) Appl. No.: 10/329,201

(22) Filed: Dec. 23, 2002

(65) Prior Publication Data

US 2004/0118087 A1 Jun. 24, 2004

(51) Int. Cl.[7] .................................. B29C 42/04
(52) U.S. Cl. ....................... 425/353; 425/359; 425/394; 425/397; 425/408
(58) Field of Search ................................ 425/353, 359, 425/360, 394, 397, 403, 408, 435, 403.1, 415

(56) References Cited

U.S. PATENT DOCUMENTS 4,034,536 A * 7/1977 Mahaffy et al. .............. 53/433
4,223,513 A * 9/1980 Mahaffy et al. .............. 53/432
5,264,230 A * 11/1993 Swanson .................... 426/512
5,705,203 A * 1/1998 Andersen et al. ........... 425/407
6,347,934 B1 * 2/2002 Andersen et al. ........... 425/557

* cited by examiner

*Primary Examiner*—Robert Davis
*Assistant Examiner*—Thu Khanh T. Nguyen
(74) *Attorney, Agent, or Firm*—LaRiviere, Grubman & Payne, LLP

(57) ABSTRACT

An apparatus that receives packaging containers and a mixture of powdered chemicals and compresses the powder into the containers at a pressure sufficient to form a solid of the powder yet not so high as to rupture the container. The apparatus is computer controlled and fully automated. The apparatus mixes a batch of chemicals in powder form, apportions a quantity of the mixture into the container and compresses it into a solid. Alternatively, the apparatus comprises a mold instead of the container for receiving the mixture portion, presses the portion into the mold and then the mold is rotated in a vertical plane to discharge the molded portion.

25 Claims, 13 Drawing Sheets

(Top)

(Side)

(Front)

MOLDING AND PACKAGING APPARATUS

TECHNICAL FIELD

The present invention pertains to machinery for molding compressible powders into specified shapes, and more specifically to molding directly into packages powders used in cleaning and personal hygiene products.

BACKGROUND ART

Most commercially available molded products are composed of specified chemicals for a specific purpose, combined with a binder, and sometimes a fluid, and molded at high pressure into tablets. The tablets are then packaged and made available to the public. What is needed is a single integrated method of forming packages of compressed powders in a single apparatus, and the apparatus for implementing the method.

DISCLOSURE OF INVENTION

The present invention is an apparatus that receives a mixture of powdered chemicals and preformed thin-walled plastic packaging containers and compresses the powder mixture into the containers at a pressure sufficient to form a solid of the powder yet not so high as to rupture the thin-walled packaging. The preferred apparatus is computer controlled and fully automated, as is the alternative embodiment but manually operated apparatuses are included within the scope of the present invention. Using commercially available components, the apparatus automatically mixes a batch of chemicals in powder form, and transfers the mixture to a hopper. From the hopper the mixture is apportioned volumetrically, or alternatively by weight, where a pre-set volume or weight of the mixture (herein a "portion") is accumulated. The portion is then moved to the inventive forming tool wherein it is placed into the pre-formed packaging and compressed. Further using commercially available components, the package is then moved to a curing station where the portion is allowed to stabilize to one or more pre-determined values such as a unit of time, moisture content, fluid content, hardness, etc. When the desired parameter is achieved, the container is sealed and moved on to another station where it is readied for shipment.

A conventional commercially available forming tool, such as a tableting or molding machine, is improved upon by the present invention. The present invention receives the portion and a preformed thin-walled plastic packaging container, places the portion into the container, and compresses the portion at a pressure generally less than 2000 pounds per square inch (psi), and preferentially in a range of approximately 10 psi to 1000 psi, directly into the container as a mold. The container may have a single cavity or cup, or multiple cups for receiving each portion for compression. Accordingly, the invention includes either a single or multiple press head having at least one upper mold section for accommodating the associated container.

Another embodiment of the forming tool of the present invention comprises a lower mold section for receiving the portion in lieu of the thin-walled container. In this embodiment the lower mold section receives the portion, the press head compresses the portion into the lower mold, then withdraws from the lower mold. The lower mold is then inverted to discharge the compressed portion, which is then transferred to a transport, curing and packaging sequence of machines. The lower mold may be subject to one or more abrupt forces or taps, vibration or an air flow or the like to extract the compressed portion from the lower mold. This embodiment may be operated at pressures greater than 2,000 psi.

BRIEF DESCRIPTION OF THE DRAWINGS

For fuller understanding of the present invention, reference is made to the accompanying drawing in the following DETAILED DESCRIPTION OF THE INVENTION. Reference numbers refer to the same or equivalent parts of the present invention throughout the several figures of the drawing. In the drawing.

MODS FOR CARRYING OUT THE INVENTION

Figure 1:
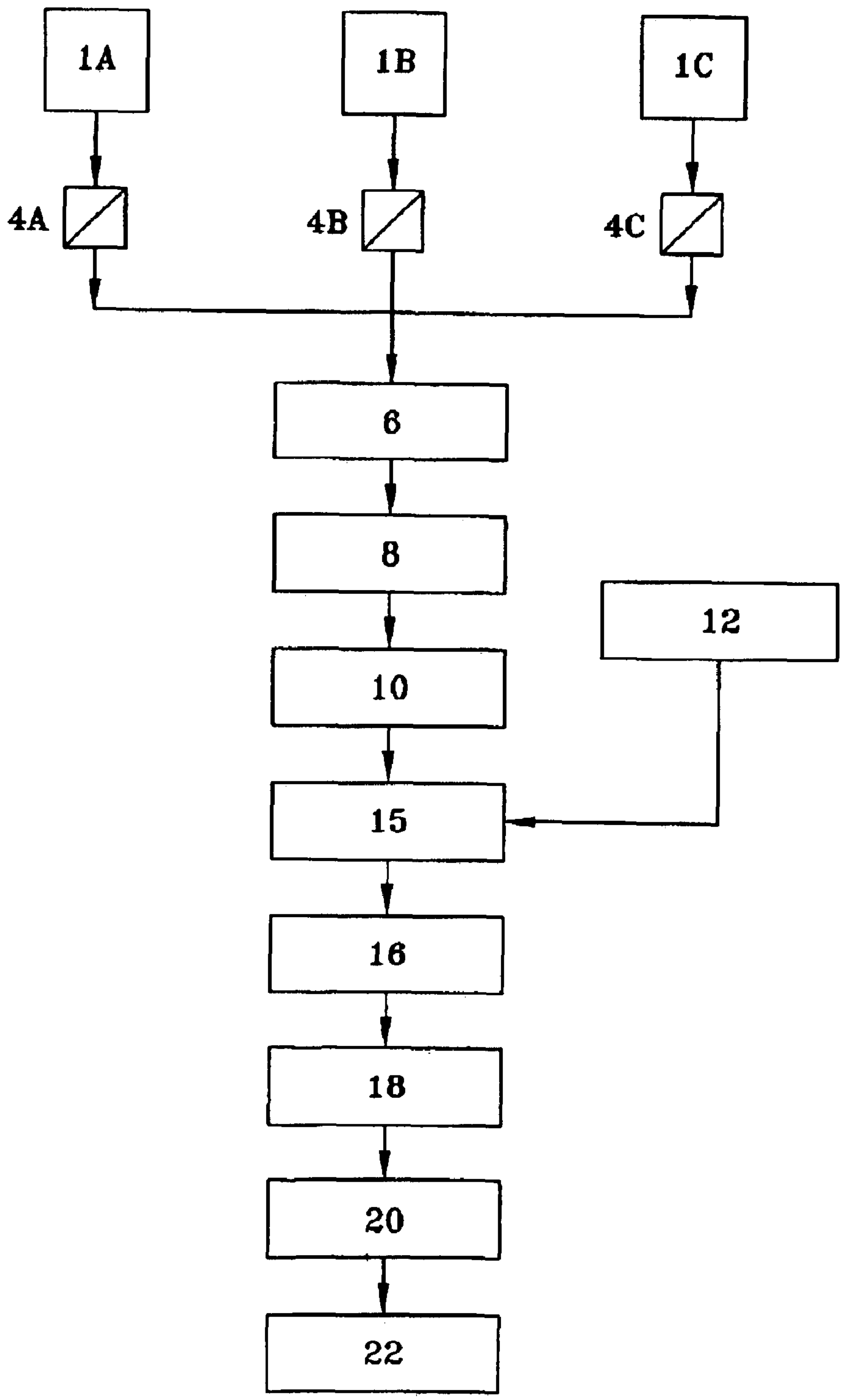
FIG. 1 is a block diagram of a first embodiment of the method of the present invention.

The present invention is an improved apparatus that receives a mixture of powdered chemicals and preformed plastic packaging containers (herein "package") and compresses the powder into shapes in the packages, at a pressure sufficient to form a solid of the powder yet not so high as to rupture the packaging. The apparatus is computer controlled and fully automated. Alternatively, the apparatus may be manually operated. FIG. 1 represents the steps performed by the preferred embodiment of the system, in which an improved molding machine is represented by block 15. The other blocks represent commercially available components forming part of the present invention.

A variety of chemicals of the appropriate purity for the nature of the product to be created are provided in separate source hoppers 1. For ease of understanding the following discussion, three such hoppers (1A, 1B, 1C) are shown, but it is to be understood that any number of such hoppers may be used. Following instructions inputted into the programmable controlling computer by an operator, measuring valves 4 are operated to allow a pre-determined quantity of chemical to enter the mixer 6. Depending on the chemicals used, the materials from which the hoppers 1, valves 4 and mixer 6 are made or lined, are selected so as to provide free-flowing non-stick surfaces for the chemicals to contact. For example, stainless steel may be non-stick for salt (NaCl) but not for other chemicals, compounds, or mixtures. Suitable materials include, but are not limited to, stainless steels, ceramics and plastics such as polycarbonates, polytetrafluroethylene, polyvinyl chloride, high density polyethylene, polymeric amides, polymeric acetyls, and the like.

The apparatus automatically mixes a batch of chemicals 1, taking care to not over-mix them. That is to say, it is important that mixing take place only long enough to homogenize the batch, but not so long that the chemicals can begin to react with each other. At the appropriate time, the computer directs transfer of the mixture from mixer 6 to a second hopper 8. From hopper 8 the mixture is apportioned to a measuring device 10 which is preferentially a volumetric device such as a screw feeder, or alternatively may be a weighing device such as a weight scale, where a pre-set quantity of the mixture (herein a "portion") is accumulated. This accumulation can occur in one of two alternatives: into an intermediate transfer container (not shown), or directly into a cup-shaped package 13 (FIG. 2) coming from package maker 12, which may be an apparatus to form such packages, or alternatively a supply of packages. The portion is then moved to a forming tool 15 wherein it is compressed. The following discussion uses the singular for simplicity but includes plural forms to accommodate multi-cup packages.

The preferred method is to accumulate the portion into an intermediate transfer container, place the package into the mold, discharge the portion from the transfer container to the package, and compress the portion directly into cup 131 of package 13. Because the portion is in a loosely packed state and has a relatively larger volume, a guide or funnel-like collar ("funnel", not shown) is first introduced over each receiving cup 131 of container 13 to receive and confine the portion during the molding step.

The mold is formed with two sections, an upper section and a lower section, in the desired shape for the finished product; the lower section is dimensioned to accept and fully support package 13 so that the portion may be molded directly into package 13. That is, the lower mold section is shaped to receive and support each cup 131 of package 13 during the molding process, and can take on any shape defined by package 13. The upper mold section is shaped to form the upper surface of the solid compressed portion in each cup 131. The upper mold section may include either fixed or moveable inserts to emboss or form structures such as indicia, cavities in or protrusions on the upper surface of the molded portion, or to form a hole passing completely through the molded portion.

In shaping the molds it is necessary to maintain a slight, 1 to 5 degree, slope to the mold sides so that the molded portion may be extracted at the time of use. It is critical that any part or surface of the mold, or other parts or surfaces of the apparatus that directly contact the portion, be made of a material that provides a free-flowing surface to the portion so that the molded product can be easily released by the mold. Suitable materials include, but are not limited to, stainless steel, ceramic, and plastics such as polycarbonates, polytetrafluroethylene, poly vinyl chloride, high density polyethylene, polymeric amides, polymeric acetyls, and the like.

Once a portion is placed into each cup 131 of package 13, the upper mold section is brought to bear on the portion confined in cup 131 and the funnel. Forming tool 15 exerts a pressure generally less than approximately 2,000 psi, preferably in the range of approximately 10 psi to approximately 1000 psi, depending on the constituents of the portion, the degree of compression desired in the finished product, and the desired density of the finished product. Higher molding pressures into suitably sturdier packages are included within the scope of the present invention. The portion is compressed into the shape determined by the upper and lower mold sections, and may bear indicia, cavities or protrusions as determined by the upper mold section. Forming tool 15 then withdraws the upper mold section from the funnel, removes the funnel from over cup 131, and passes package 13 on to the remainder of the system. Forming tool 15 may be powered electrically and may further use hydraulic or pneumatic cylinders, for example to move the mold sections.

Package 13, having a molded portion in each cup 131, is then moved by the system to a curing station 16 in which the molded portions are held for a time period 18, and may be subjected to a suitable ambient such as low humidity air. Package 13 is held in curing station 16 for a pre-determined length of time 18 for the molded portion to stabilize. This time depends on the mixture of the portion, and may vary from only a few minutes to several days. Some mixtures may bypass the curing station 16 completely. Once the compressed portion has stabilized, package 13 moves on to a sealing apparatus 20 to receive a cover, then on to shipping 22. The cover may be unitary to allow the exposure of all cups 131 when removed, or fragmented to expose cups 131 one at a time. As desired, some of the system steps may be deleted without detracting from the present invention.

Figure 3:
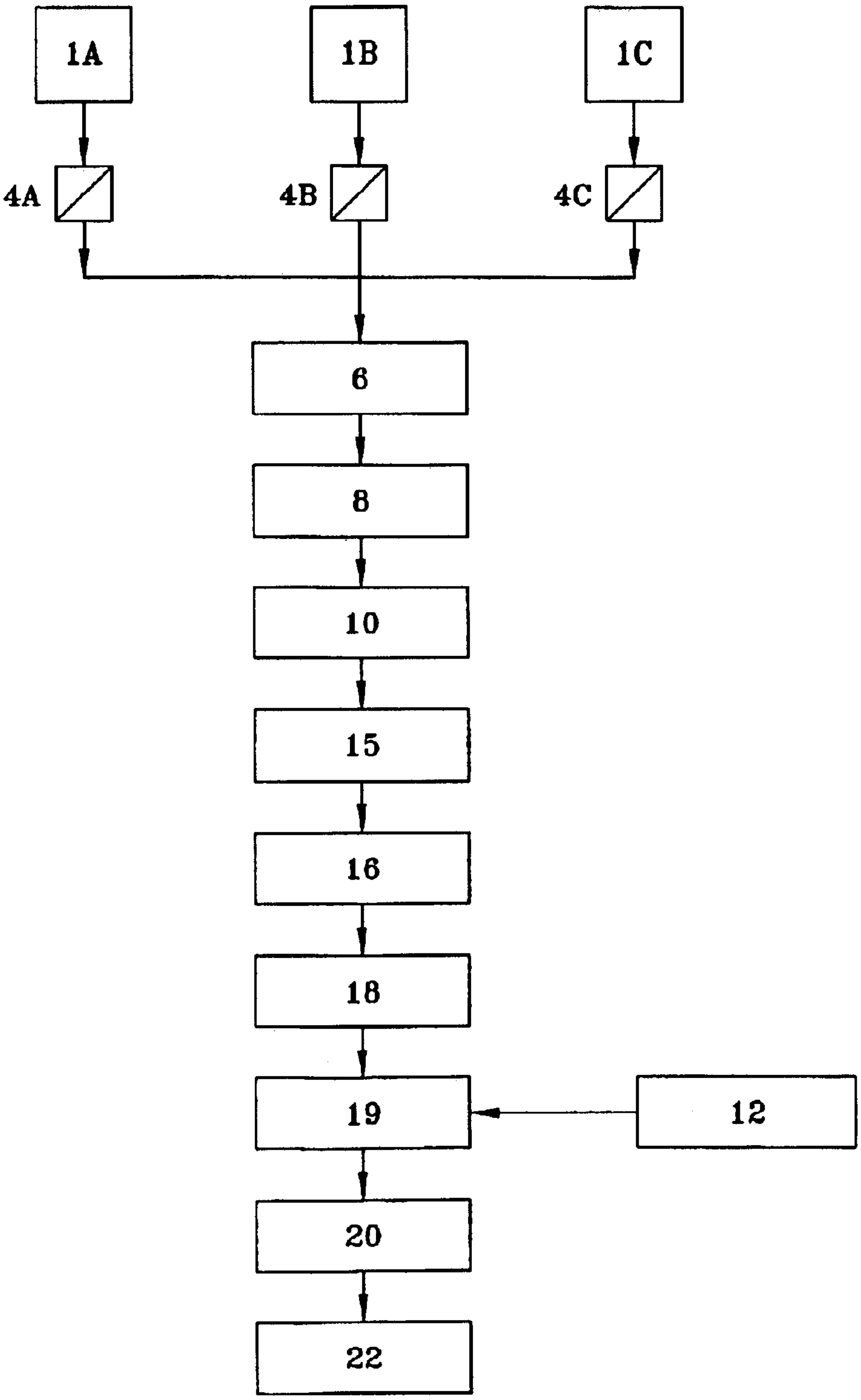
FIG. 3 is a block diagram of a second embodiment of the method of the present invention.

In a second embodiment of the invention as indicated in FIG. 3, the forming tool 15 receives the portion for compression in at least one mold without the presence of the package 13. In this case, the lower mold section may also be shaped to any desired shape, such as flat bottomed, hemispherical, convex, or concave. The forming tool 15 places the funnel over the lower mold section, the portion is introduced to and confined by the funnel and lower mold section, and the upper mold section is pressed upon the portion, forming a compressed mass of the portion which takes the shape determined by the upper and lower mold sections. The upper mold section is then withdrawn and the funnel is removed. Alternatively, the lower mold section may be formed with an integral funnel, e.g. with a depth sufficient to receive and contain the entire volume of the portion. The upper mold section may include either fixed or moveable inserts to emboss or form indicia, cavities in or protrusions on the upper surface of the molded portion, or holes completely through the molded portion (a toroid or "donut").

The forming tool may alternatively consist of one or more mold lower section mounted on a moveable platform or turret capable of movement in both a horizontal (X-Y motion) and vertical plane. The lower mold section may also take the form of more than one mold mounted on the moveable platform or turret, each lower mold section receiving in turn a funnel and a portion to be compressed. After each lower mold section is filled, the turret rotates in a horizontal plane to a pressing station (not shown). The forming tool 15 then moves the upper mold section down on each lower mold section, compressing the portion into the mold with a pressure in a range of approximately 10 psi to approximately 1,000 psi, up to an approximate maximum of 2,000 psi. Higher pressures may be utilized if desired.

After the portion is pressed into the mold and the upper mold section is withdrawn, forming tool 15 rotates the lower mold section, or the entire turret, approximately 90 to approximately 180 degrees in a vertical plane, to discharge the molded portion. The lower mold section, if necessary, may be subjected to one or more sharply delivered blows, vibration, a stream of air, or other means, to loosen the compressed portion in the mold, whereupon the molded portion is ejected from the forming tool mold, and then transferred to curing station 16 and subsequent operations.

Curing station 16 generally includes a tray-like structure (not shown) with pre-formed locations for receiving the molded portion. Curing station 16 may be capable of moving the tray horizontally in an X-Y manner so that each molded portion can be individually placed into a specific location. This prevents the molded portions from colliding with each other during handling, so that each portion retains the shape into which it was pressed. When the receiver tray is filled, it is moved to a holding location (not shown) for time period 18 as described above. Alternatively, a linear motion receiver may be used with appropriate changes.

In curing station 16 the molded portion is allowed to stabilize to a pre-determined value. Parameters such as moisture content, density, or time may be applicable, depending on the chemical nature of the molded portion. When the desired parameter value is reached, the molded portion is placed into a package from package maker 12 by packing apparatus 19, the package is sealed at step 20 and moved on to station 22 where it is readied for shipment.

Figure 4:
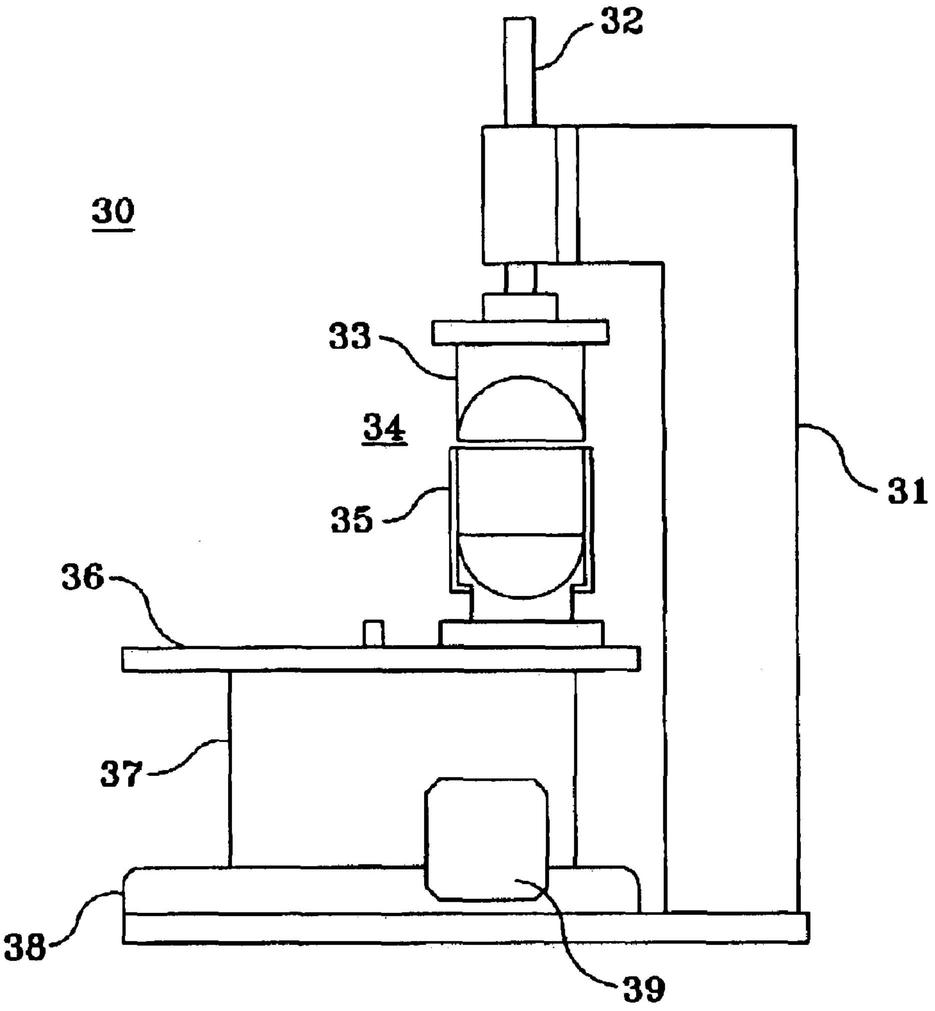
FIG. 4 is a first side view of the apparatus of the second embodiment.
Figure 5:
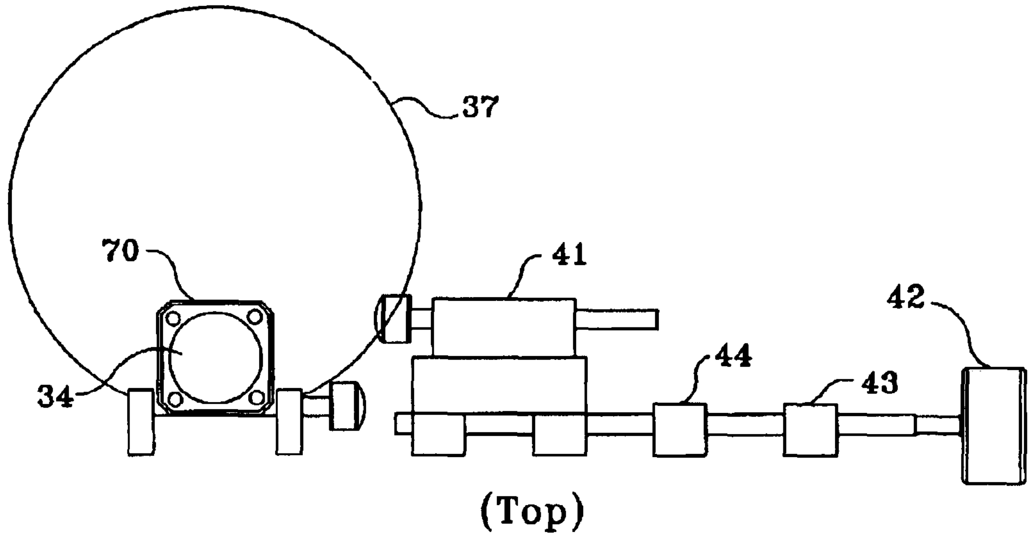
FIG. 5 is a combined front, side, top view of the second embodiment of the apparatus.
Figure 5:
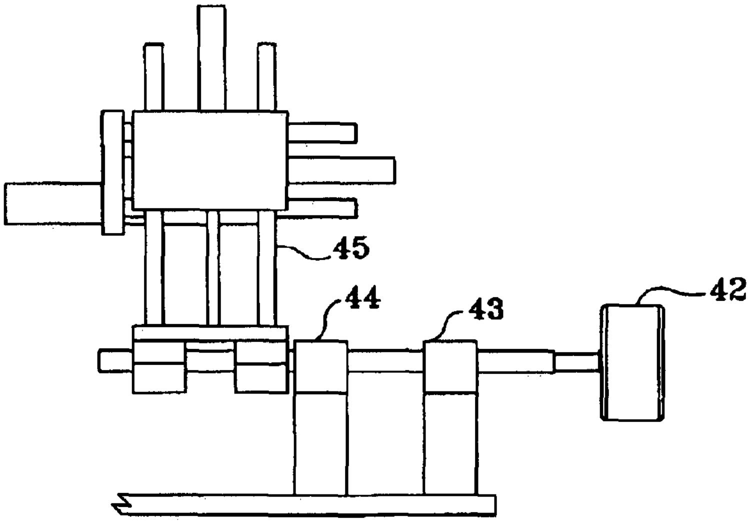
Figure 5:
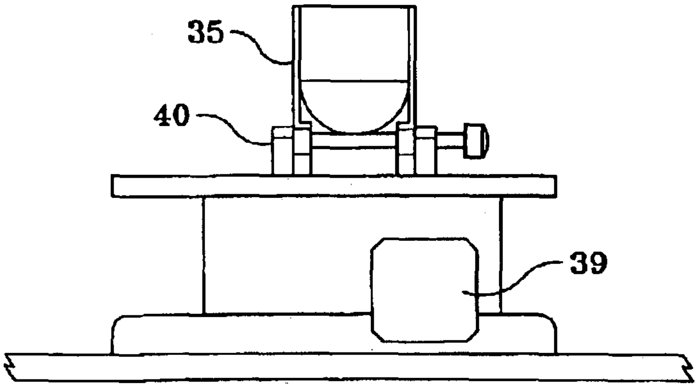

Referring now to FIG. 4, a side view of the forming tool 15 apparatus of the second embodiment 30 is shown. Support frame 31 provides the necessary structural support for the apparatus. Piston 32 is actuated either pneumatically, hydraulically or electrically for pressing and withdrawing motion. Top mold section 33 is attached to piston 32 and mates with bottom mold section 35, thereby comprising mold 34. Mold lower section 35 is mounted preferably on rotary turntable 37, having a base 38, top 36 and actuator 39. It is understood that turntable frame 37 may also have a linear arrangement as an alternative configuration, in which case one or more linear actuators would be required FIG. 5 is a composite front, top and side view of the second embodiment. The top view shows the rotary turntable 37 relative to mold 34, mounted in holder 70. Linear actuators 41, 45 and rotary actuator 42 provide for component movement as necessary. Bearings 43, 44 provide support as is known in the art. Holder 70 is connected with turn arm 40 to allow for rotation of holder 70 through 180 degrees for discharging a molded portion from mold 34.

Figure 6:
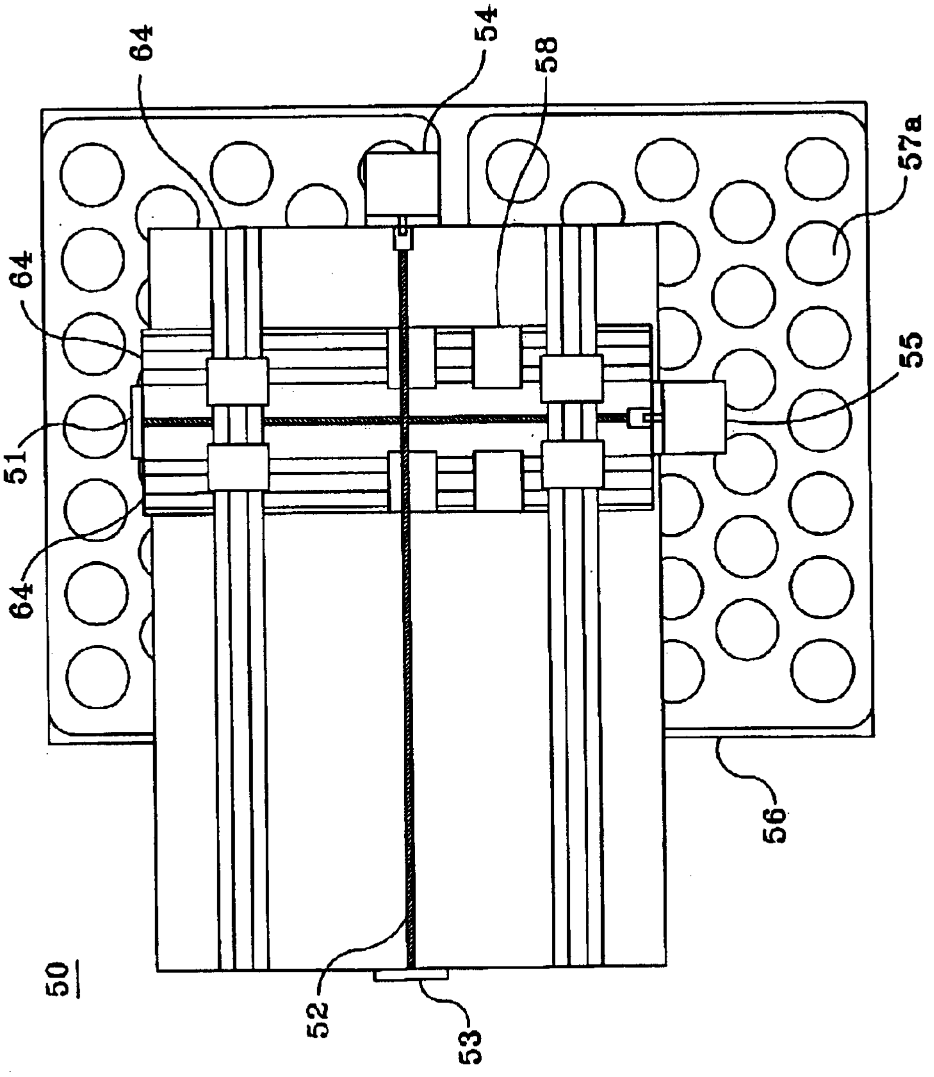
FIG. 6 is a top view of the X-Y apparatus for moving the curing trays associated with the second embodiment.

FIG. 6 is a top view of an exemplary X-Y table 50 for a receiving/curing tray 56 associated with the second embodiment. Servo motors 54, 55 move tray 56 as needed under control of the operator, either manually or preferably by computer direction, so as each molded portion is discharged from the mold, it is received into an individual portion 57*a* of the tray, somewhat like placing an egg into an egg tray. Lead screws 52 provide the necessary movement and are supported by end blocks 51, 53. Guide blocks 58 connect tray 56 to lead screws 52. Linear bearing guide rails 64 provide movement restraint as is known in the art.

Figure 7:
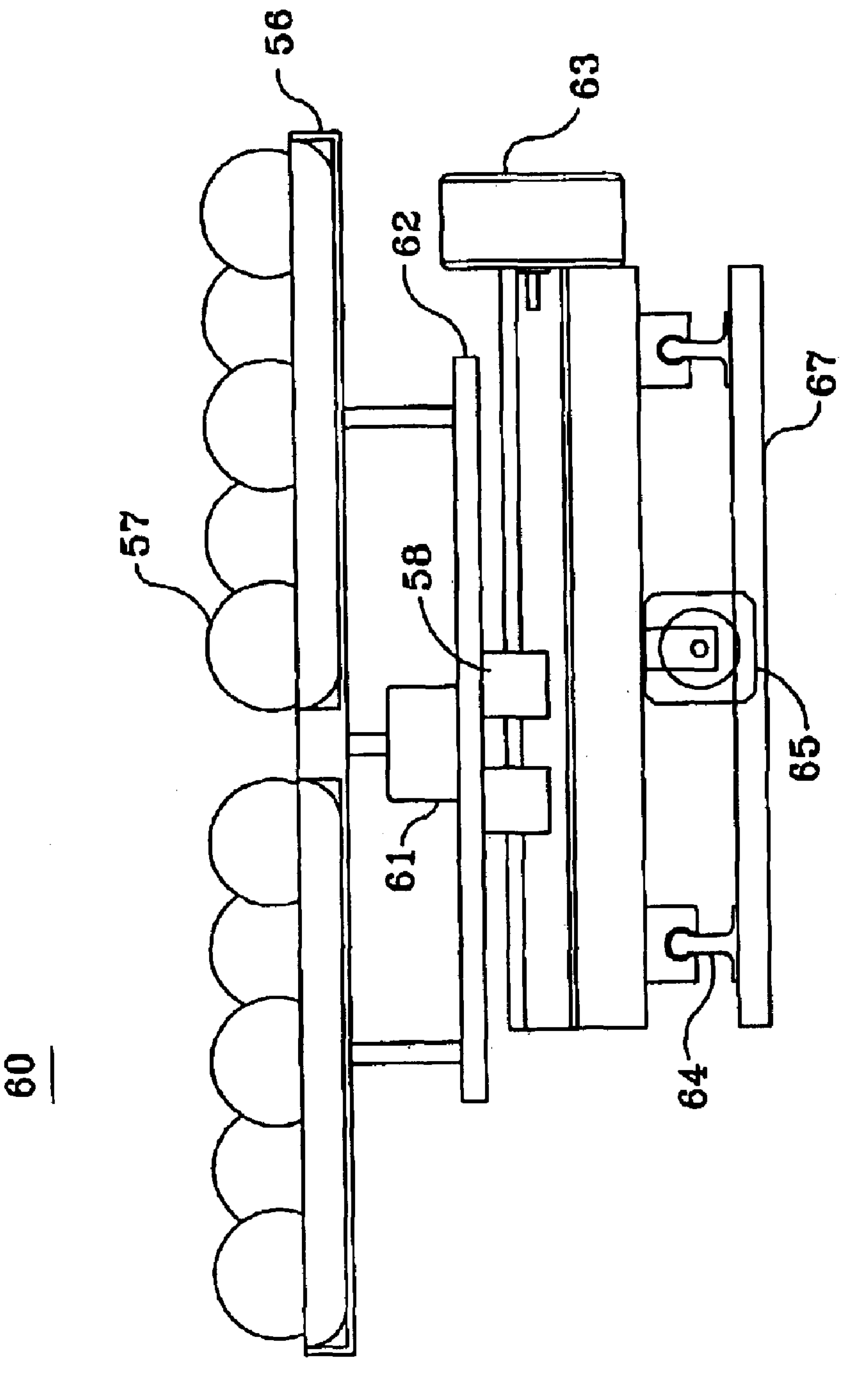
FIG. 7 is a side view of the apparatus for unloading the curing trays associated with the second embodiment.

FIG. 7 is a side view of the product 57 (compressed portion) tray 56 unloading apparatus 60 associated with the second embodiment. Rotary actuator 61 , 360-degree actuator 63 and servo motor 65 provide the necessary motion for movement. Linear bearings 64 support and guide movement of tray 56. Base 67 and rotary actuator base plate 62 provide supporting structure for the apparatus.

Figure 8:
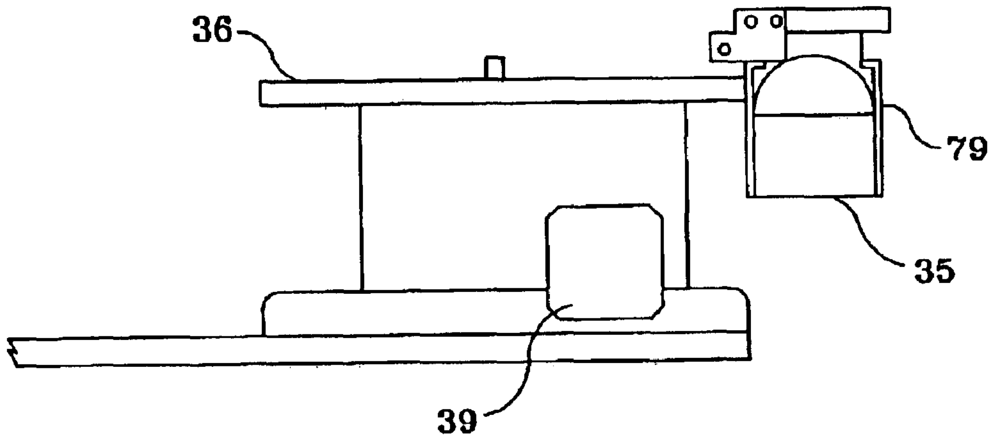
FIG. 8 is a side view of the second embodiment with the mold holder rotated 180 degrees to discharge the molded portion.
Figure 10:
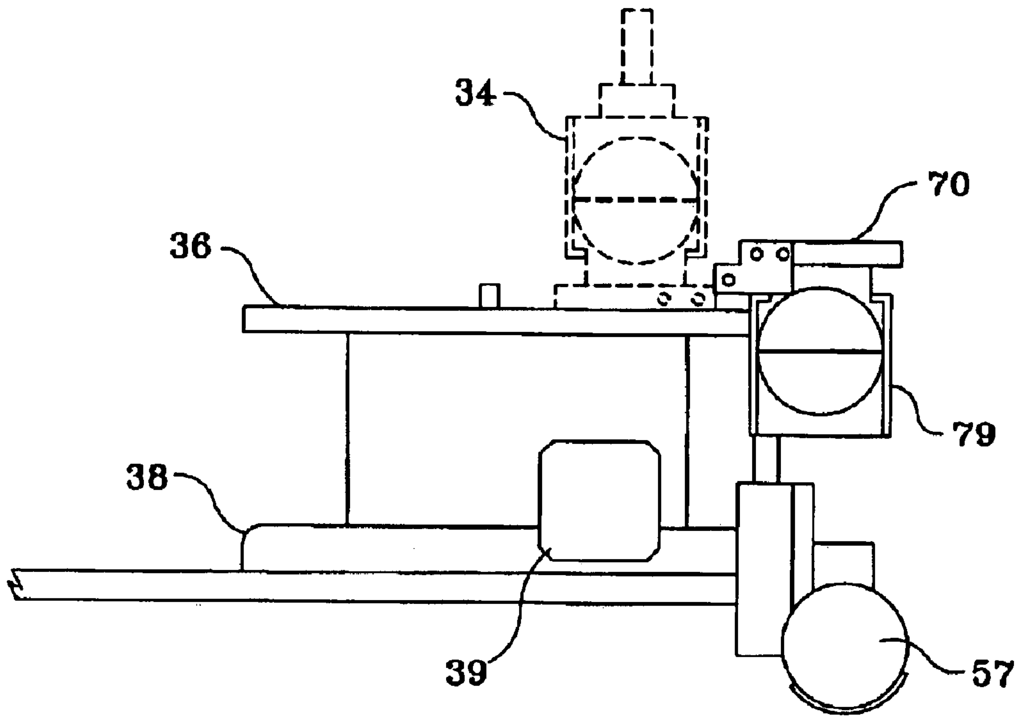
FIG. 10 is a side view of the second embodiment mold, showing the mold position for pressing and rotated 180 degrees for discharge of the molded portion.

FIGS. 8 and 10 illustrate the rotary movement of mold 34, showing mold 34 rotated 180 degrees into the product 57 discharge or ejection position 79. The phantom lines show the starting or molding position of mold 34 holder 70. Intermediate rotation positions of less than full rotation may be suitable for certain shapes or compositions of product 57. which are more easily released from mold 34. Not shown, but understood may be present, is a discharge aid such as a stream of air or a vibratory/jarring motion actuator to initiate the discharge of product 57 from mold 34.

Figure 9:
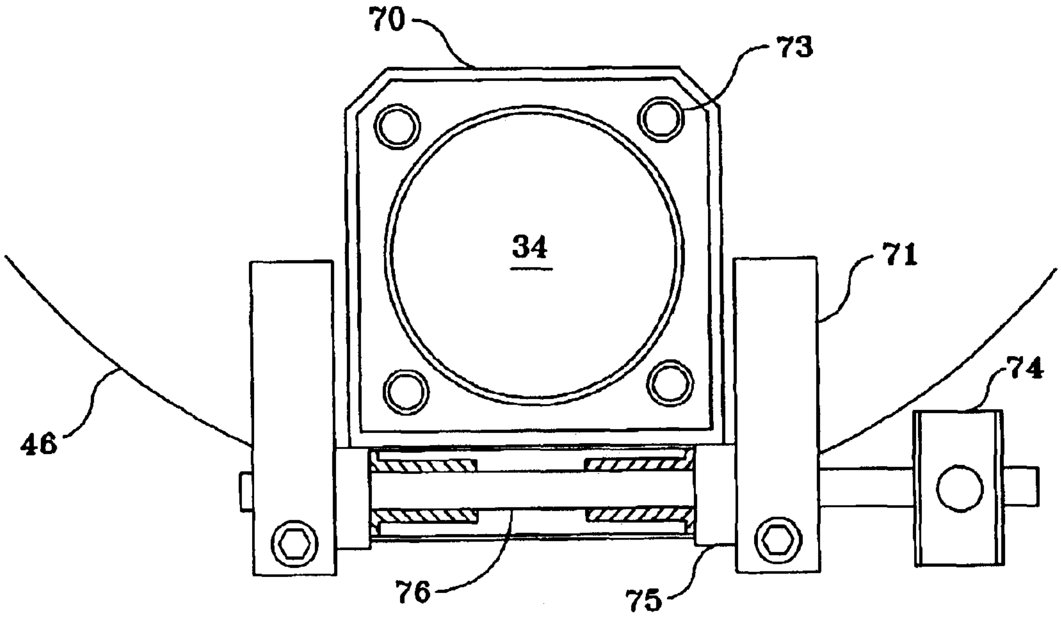
FIG. 9 is a top view of the mold holder of the second embodiment.
Figure 11:
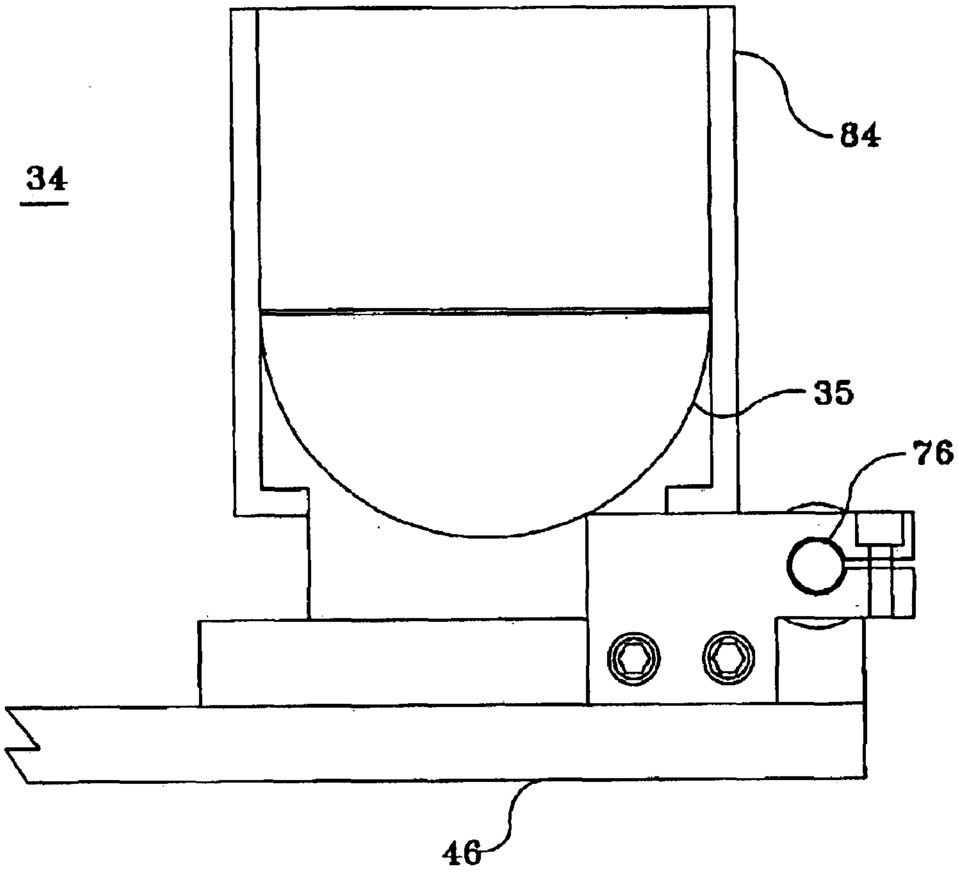
FIG. 11 is a detail of the mold holder and turning shaft of the second embodiment.

FIGS. 9 and 11 are details of mold holder 70, illustrating a preferred configuration. Mold 34 is placed into holder 70 and secured with fasteners, such as bolts, through mounting holes 73. Rotating shaft 76 allows for mold rotation up to 180 degrees. Stop 74 may be adjusted as desired to select lesser rotation angles. Bearing 75 and bearing support 71 provide the necessary structural support. A portion 46of rotary table 37 is indicated. Mold 34 consists of three sections: top section 33, bottom section 35, and funnel section 84. In some variations, funnel 84 may be combined with bottom section 35, or may be a separate piece which may be moved independently of bottom section 35.

Figure 12:
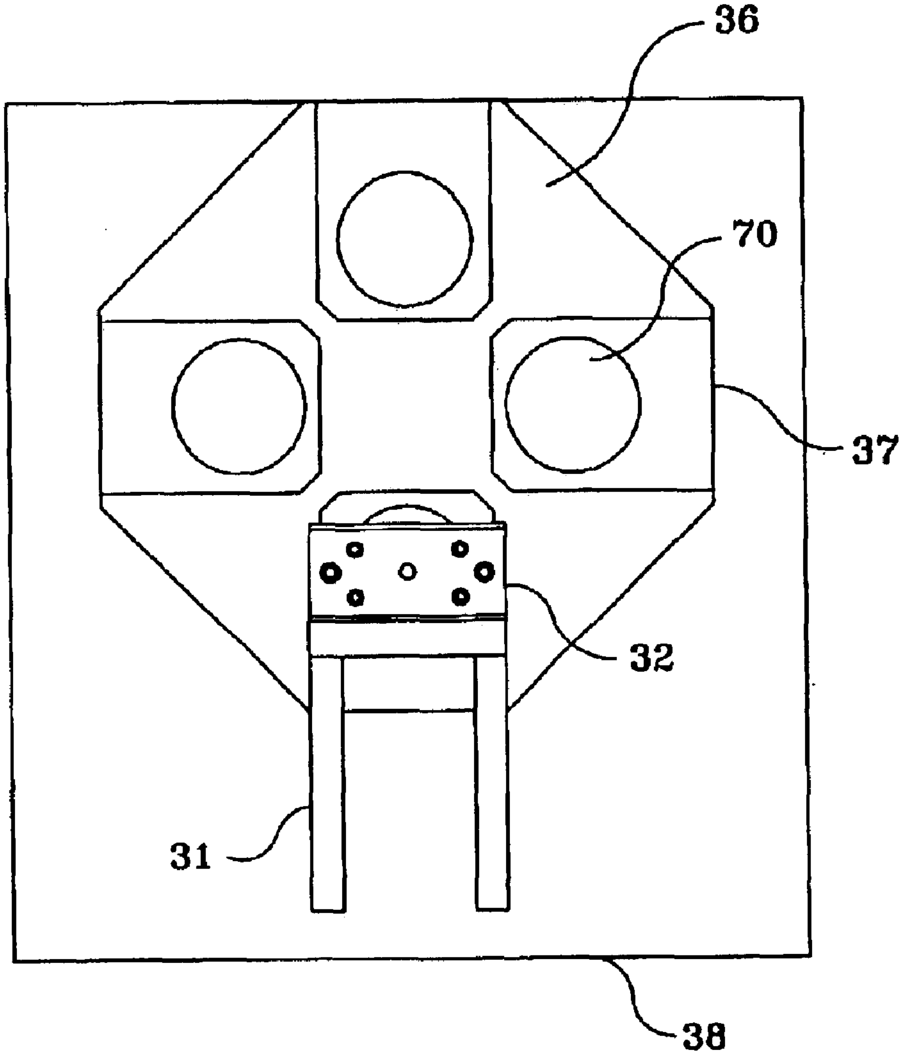
FIG. 12 is a top view of an exemplary rotary table for use with the second embodiment showing an exemplary piston actuator.

FIG. 12 is a top view of an exemplary rotary table 37 having top surface 36 configured for receiving four molds 34. More or fewer molds care included within the scope of the invention. Mold holder 70, table 37, piston 32, base 38 and support frame 31 are as identified hereinabove.

Figure 13:
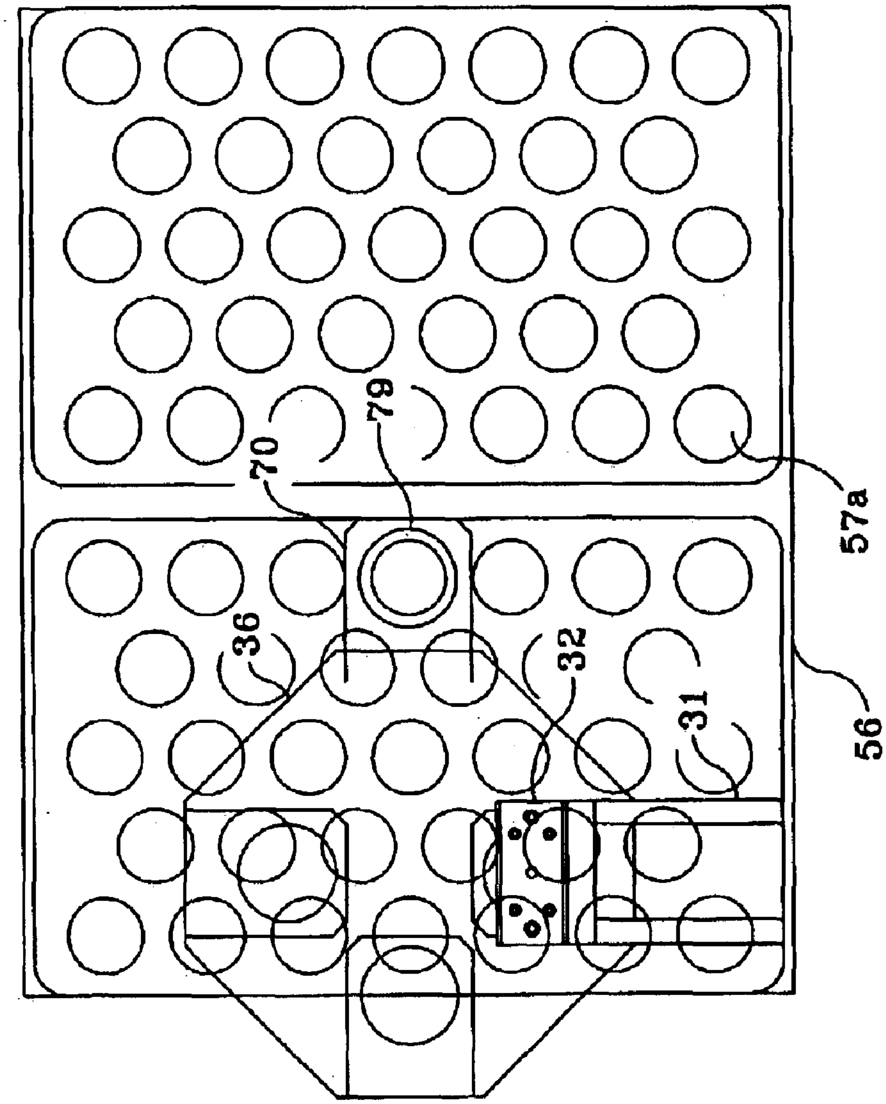
FIG. 13 is a top view of the apparatus of the second embodiment showing a position relative to the receiving/curing tray apparatus associated with the second embodiment.

FIG. 13 is a top view of the apparatus of the second embodiment, showing one arrangement of the forming tool 15 in relation to the curing station 16 receiving tray 56. Other arrangements may also be used.

Figure 2:
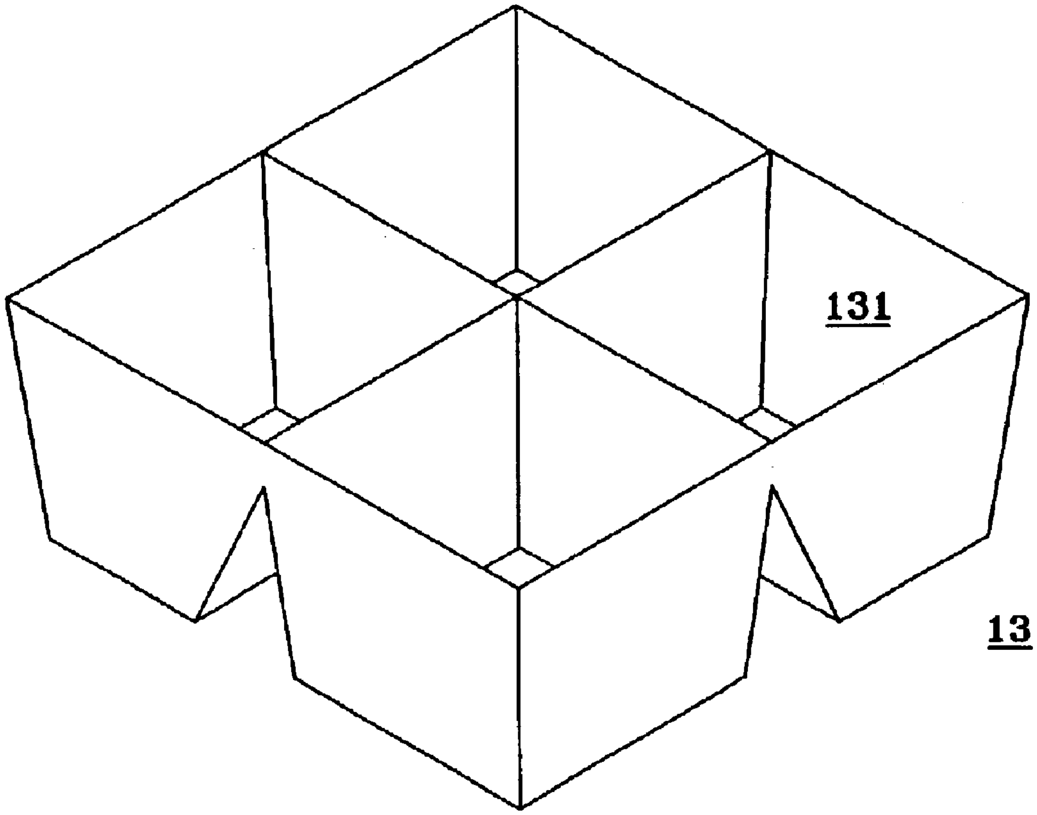
FIG. 2 is a perspective view of a thin-walled package suitable for use in the first embodiment of claim 1.

FIG. 2 shows one embodiment of a suitable thin-walled cup-shaped container for use in the present invention. Package 13 may have a single cup 131, or multiple cups 131 as represented in FIG. 2. The upper limit of the number of cups is determined by the size of the machinery assembled and the weight of the finished product to be supported in and by package 13. It is anticipated that 4 to 12 cups would be a practical limit, but a greater number of cups is included herein. It is understood that when multiple-cup containers may be used, the forming tool 15 is adapted to include a multi-cavity lower mold section for receiving the multi-cup container, and the apparatus may be programmed to move forming tool 15 in an X-Y or other manner so as to fill and compress each cup, either sequentially or in a single step, then move the mold so as to discharge the filled multi-cup container. Similarly, multiple molds may be positioned on the moveable platform or turret to receive pre-formed packages to be sequentially filled, compressed, and emptied. All such configurations are contemplated by the present invention. While the preferred embodiment addresses molding solids directly into thin-walled packages, it is to be further understood that use of heavier-walled packages capable of sustaining solid-portion-forming pressures greater than 2,000 psi are included in the present invention.

Information as herein shown and described in detail is fully capable of attaining the above-described object of the invention, the presently preferred embodiment of the invention, and is, thus, representative of the subject matter which is broadly contemplated by the present invention. Although the description above contains many specificities, these should not be construed as limiting the scope of the invention but as merely providing illustration of some of the presently preferred embodiments of the invention.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, material, and fabrication detail may be made without departing from the spirit and scope of the inventions as set forth in the appended claims. No claim herein is to be construed under the provisions of 35 U.S.C. 112, sixth paragraph, unless the element is expressly recited using the phrase "means for".

INDUSTRIAL APPLICABILITY

The present invention finds industrial applicability in machinery for molding compressible powders into specified shapes, and more specifically to molding directly into packages powders used in cleaning and personal hygiene products.

SCOPE OF THE INVENTION

The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more". All structural, chemical and functional equivalents to the elements of the above-described preferred embodiment and additional embodiments that are known to those of ordinary skill in the art are hereby expressly incorporated by reference and are intended to be encompassed by the present claims.

What is claimed is:

1. An apparatus for forming a molded shape from a portion of chemicals, the apparatus having at least one hopper for receiving at least one chemical, at least one metering valve for releasing the chemical from the at least one hopper, a mixer for receiving and mixing the released chemical, and a measuring means for selecting the portion of the chemical, comprising:

a forming tool for receiving the portion of the chemical and a preformed package having at least one cup; and a press for compressing the portion into the at least one cup, wherein the press exerts a pressure in a range of approximately 10 pounds per square inch to approximately 1,000 pounds per square inch.

2. An apparatus as in claim 1 further having a programmable computer for controlling the apparatus.

3. An apparatus as in claim 1 further comprising means for sealing the package after the portion is compressed into the at least one cup.

4. An apparatus as in claim 1 wherein the forming tool further comprises a lower mold section shaped to support the at least one cup.

5. An apparatus as in claim 4 wherein the forming tool further comprises at least one upper mold section attached to a press.

6. An apparatus as in claim 5 wherein the upper mold section includes inserts to form one or more structures selected from a group consisting of: a smooth surface, at least one hole through the molded portion, indicia, cavities in, and protrusions on the upper surface of the molded portion.

7. An apparatus as in claim 1 further having means for forming the preformed package.

8. An apparatus for forming a molded shape from a portion of chemicals, the apparatus having at least one hopper for receiving at least one chemical compound, at least one metering valve for releasing the chemical compound from the hopper, a mixer for receiving and mixing the released chemical compound, and a measuring means for selecting the portion of the chemical compound, comprising:

at least one mold for receiving the portion of the chemical compound, the at least one mold having an upper section and a lower section, the sections having surfaces which contact the portion;

a press for compressing the portion into the at least one mold to form a molded portion, wherein the press exerts a pressure in a range of approximately 10 pounds per square inch to approximately 1,000 pounds per square inch; and means for rotating in a vertical plane at least the mold lower section to discharge the molded portion.

9. An apparatus as in claim 8 further having a programmable computer for controlling the apparatus.

10. An apparatus as in claim 8 wherein the surfaces of the mold that contact the portion are made of a material selected from a group consisting of stainless steel, ceramic, plastics, polycarbonates, polytetrafluroethylene, poly vinyl chloride, high density polyethylene, polymeric amides, polymeric acetyls.

11. An apparatus as in claim 8 wherein the upper mold section includes inserts to form on the upper surface of the molded portion one or more structures selected from a group consisting of: a smooth surface, at least one hole through the molded portion, indicia, cavities in, and protrusions.

12. An apparatus for forming a molded shape from a portion of chemicals, the apparatus having at least one hopper for receiving at least one chemical, at least one metering valve for releasing the chemical from the at least one hopper, and a mixer for receiving and mixing the released chemical, comprising:

a measuring means for selecting the portion of the chemical;

a forming tool having a lower mold for receiving a preformed package having at least one cup and the portion of the chemical; and a press having an upper mold for compressing the portion into the at least one cup, wherein the press exerts a pressure in a range of approximately 10 pounds per square inch to approximately 1,000 pounds per square inch, and wherein the upper mold section includes inserts to form on the upper surface of the molded portion one or more structures selected from a group consisting of: a smooth surface, at least one hole through the molded portion, indicia, cavities in, and protrusions.

13. An apparatus as in claim 12 further having a programmable computer for controlling the apparatus.

14. An apparatus as in claim 12 wherein the measuring means is selected from a group consisting of volumetric measurer and weight measurer.

15. An apparatus as in claim 12 further comprising means for sealing the package after the portion is compressed into the at least one cup.

16. An apparatus as in claim 12 wherein the surfaces of the mold that contact the portion are made of a material selected from a group consisting at least of stainless steel, ceramic, plastics, polycarbonates, polytetrafluroethylene, poly vinyl chloride, high density polyethylene, polymeric amides, and polymeric acetyls.

17. An apparatus for forming a molded shape from a portion of chemicals, the apparatus having at least one hopper for receiving at least one chemical compound, at least one metering valve for releasing the chemical compound from the hopper, and a mixer for receiving and mixing the released chemical compound, comprising:

a measuring means for selecting the portion of the chemical compound, wherein the measuring means is selected from a group consisting of volumetric measurer and weight measurer;

at least one mold for receiving the portion of the chemical compound, the at least one mold having an upper section and a lower section, the sections having surfaces which contact the portion, wherein the upper mold section includes inserts to form one or more structures selected from a group consisting of: a smooth surface, at least one hole through the molded portion, indicia, cavities in, and protrusions on the upper surface of the molded portion;

a press for compressing the portion into the at least one mold to form a molded portion, wherein the press exerts a pressure in a range of approximately 10 pounds per square inch to approximately 1,000 pounds per square inch; and means for rotating in a vertical plane at least the mold lower section to discharge the molded portion.

18. An apparatus as in claim 17 further having a programmable computer for controlling the apparatus.

19. An apparatus as in claim 17 wherein the surfaces of the mold that contact the portion are made of a material selected from a group consisting at least of stainless steel, ceramic, plastics, polycarbonates, polytetrafluroethylene, poly vinyl chloride, high density polyethylene, polymeric amides, and polymeric acetyls.

20. An apparatus for forming a molded shape from a portion of chemicals, comprising:

at least one for receiving at least one chemical;

at least one metering valve for releasing the chemical from the at least one hopper;

mixing means for receiving and mixing the released chemical;

measuring for selecting the portion of the chemical;

means for forming a package having at least one cup;

a forming tool for receiving the portion of the chemical and a performed and the package having at least one cup;

a press for compressing the portion into the at least one cup, wherein the press exerts a pressure in a range of approximately 10 per square inch to approximately 1,000 pounds per square inch; and a programmable computer for controlling the apparatus.

21. An apparatus as in claim 20 wherein the measuring means is selected from a group consisting of volumetric measurer and weight measurer.

22. An apparatus as in claim 20 further comprising means for sealing the package after the portion is compressed into the at least one cup.

23. An apparatus as in claim 20 wherein the forming tool further comprises a lower mold section shaped to support the at least one cup.

24. An apparatus as in claim 23 wherein the forming tool further comprises at least one upper mold section attached to a press.

25. An apparatus as in claim 24 wherein the upper mold section includes inserts to form one or more structures selected from a group consisting of: a smooth surface, at least one hole through the molded portion, indicia, cavities, and protrusions on the upper surface of the molded portion.

* * * * *

UNITED STATES PATENT AND TRADEMARK OFFICE
CERTIFICATE OF CORRECTION

PATENT NO. : 6,805,545 B2
DATED : October 19, 2004
INVENTOR(S) : Jeffrey K. Slaboden It is certified that error appears in the above-identified patent and that said Letters Patent is hereby corrected as shown below:

<u>Column 10,</u>
Line 1, insert the word -- hopper -- after the phrase “at least one”.

Signed and Sealed this

Fifteenth Day of February, 2005

JON W. DUDAS
*Director of the United States Patent and Trademark Office*